United States Patent [19]
Stanuch

[11] Patent Number: 5,426,417
[45] Date of Patent: Jun. 20, 1995

[54] OSCILLATING WARNING LIGHT FOR EMERGENCY VEHICLE

[75] Inventor: Edward S. Stanuch, Oak Forest, Ill.

[73] Assignee: Federal Signal Corporation, University Park, Ill.

[21] Appl. No.: 42,816

[22] Filed: Apr. 5, 1993

[51] Int. Cl.⁶ .............................................. B60Q 7/00
[52] U.S. Cl. .................................... 340/473; 340/471; 340/472; 362/35; 362/74; 74/42
[58] Field of Search .................. 340/471, 472, 473; 362/35, 74, 282; 74/42

[56] References Cited

U.S. PATENT DOCUMENTS

| | | | |
|---|---|---|---|
| 2,629,828 | 2/1953 | Cady et al. | 74/42 |
| 4,387,362 | 6/1983 | Gosswiller | 362/35 |
| 4,785,678 | 11/1988 | McGugan et al. | 74/42 |
| 4,931,768 | 6/1990 | Jincks et al. | 362/35 |
| 5,207,496 | 5/1993 | Stanuch et al. | 340/471 |

*Primary Examiner*—Brent Swarthout
*Assistant Examiner*—Nina Tong
*Attorney, Agent, or Firm*—Leydig, Voit & Mayer, Ltd.

[57] ABSTRACT

A warning light assembly is provided that includes a simple drive train for accomplishing an 180° or more oscillation of a light beam. By advantageously utilizing a speed-reduction mechanism, a transmission for converting rotary motion to oscillating motion and a coupling for multiplying the angle of oscillation, the drive provides an inexpensive and rugged enabling design the warning light assembly to oscillate a light beam through angles heretofore unattainable.

15 Claims, 3 Drawing Sheets

OSCILLATING WARNING LIGHT FOR EMERGENCY VEHICLE

FIELD OF THE INVENTION

The present invention relates to warning lights for emergency motor vehicles used by police, fire departments and the like to warn the public of dangerous conditions and, more specifically, to warning lights of the foregoing type that oscillate a light beam.

BACKGROUND OF THE INVENTION

Studies indicate that the primary area of danger for an emergency vehicle moving along a roadway is an intersection with another roadway. In order to address this danger, warning devices have been developed intended to alert vehicles moving along the intersecting roadway of the emergency vehicle as it approaches and enters the intersection. Typically, these warning devices include a light whose intensity light varies in a manner that draws attention to the light and the associated emergency vehicle even though the environment of the vehicle and the warning device is filled with other stimuli that compete for the attentions of nearby observers.

Several different approaches are well known for realizing the variable intensity required of such warning lights. For example, it is well known to use flashing lights such as strobe lights for warning devices. It is also known to use rotating or oscillating light beams that appear to an observer as the beams sweep past the observer.

Although rotating light beams are characterized by the type of high intensity useful at intersections, much of the light energy is directed away from the intersection inasmuch that the light beam rotates a full 360°. Conventional stationary warning lights are unable to direct high energy flashes over a sufficiently large area required at an intersection. Oscillating light beams, however, are capable of directing a relatively constant, high energy signal over an area determined by the sweep angle of the beam. In conventional devices of this type, the sweep angle is limited and typically is less than to approximately 120°. An example of such an oscillating light can be found in U.S. patent application Ser. No. 07/592,670, to Stanuch et al., filed Oct. 4, 1990. Although larger effective sweep angles can be created if two or more oscillating lights are ganged together, a larger sweep angle for a single oscillating beam is desirable.

SUMMARY OF THE INVENTION

It is therefore a primary object of the present invention to provide a warning light assembly that provides an oscillating light beam that can be swept through an angle that approaches and may exceed 180°. In this connection, it is a related object of the present invention to provide a warning light assembly that achieves the foregoing object while maintaining a simple construction that is inexpensive to manufacture and is highly reliable.

It is also an object of the present invention to provide a warning light assembly that oscillates a light beam through approximately 180° or more while maintaining a relatively compact size.

Yet another object of the present invention is to provide a warning light assembly that can be easily modified to provide an oscillating light beam that sweeps out any desired angle. In this connection, it is a related object of the invention to provide the foregoing versatility while maintaining a simple, inexpensive mechanical construction for the warning light assembly.

In accordance with the foregoing objects, an oscillating warning light for an emergency vehicle is provided that comprises three gears rotatably mounted to spindles of a base assembly for driving an oscillating light beam assembly, where the first gear rotates in one direction and the second and third gears are in synchronized oscillation driven by a reciprocating motion imparted to them by the first gear. The first and second gears are coupled by a crank that converts the rotary motion of the first gear to the reciprocating motion that drives the oscillation of the second and third gears. The third gear is associated with the light beam assembly for moving a light beam through an angle $\beta$ while the second gear reciprocates through an angle $\Theta$, where the angle $\beta$ is greater than the angle $\Theta$ and the ratio of the two angles is inversely proportional to the radius of the second and third gears.

More specifically, a D.C. motor provides a drive for a worm and worm gear assembly that rotates in one direction and provides a means for reducing the speed of the drive. A first spur gear having a diameter $D_1$ is coupled to the worm gear by a crank that converts the rotary motion of the worm gear to a reciprocating movement for driving the oscillation of the first spur gear. A second spur gear having a diameter $D_2$ is driven by the first spur gear, and the second gear is rotatably mounted to be coaxial with a rotatable light beam assembly. Preferably, the second spur gear and the light beam assembly form a single assembly mounted to a spindle on the base of the warning light. The second spur gear and light beam assembly oscillate through an angle $\beta$, whereas the first spur gear oscillates through an angle $\Theta$, which is less than the angle $\beta$ and less than 180°. Because the ratio of the angles through which the two spur gears oscillate is inversely proportional to their diameters $D_1$ and $D_2$, the angle $\beta$ can be made virtually any value, but must be greater than the angle $\Theta$ assuming that $D_1$ is greater than $D_2$, by selecting the appropriate relative values for the diameters.

Other objects and advantages of the invention will become apparent upon reference to the following detailed description when taken in conjunction with the drawings.

While the invention will be described in connection with an illustrated and preferred embodiment, there is no intent to limit it to the illustrated embodiment. On the contrary, the intent is to cover all alternatives, modifications and equivalents falling within he spirit and scope of the invention as defined by the appended claims.

DETAILED DESCRIPTION OF THE PREFERRED EMBODIMENT

Figure 1:
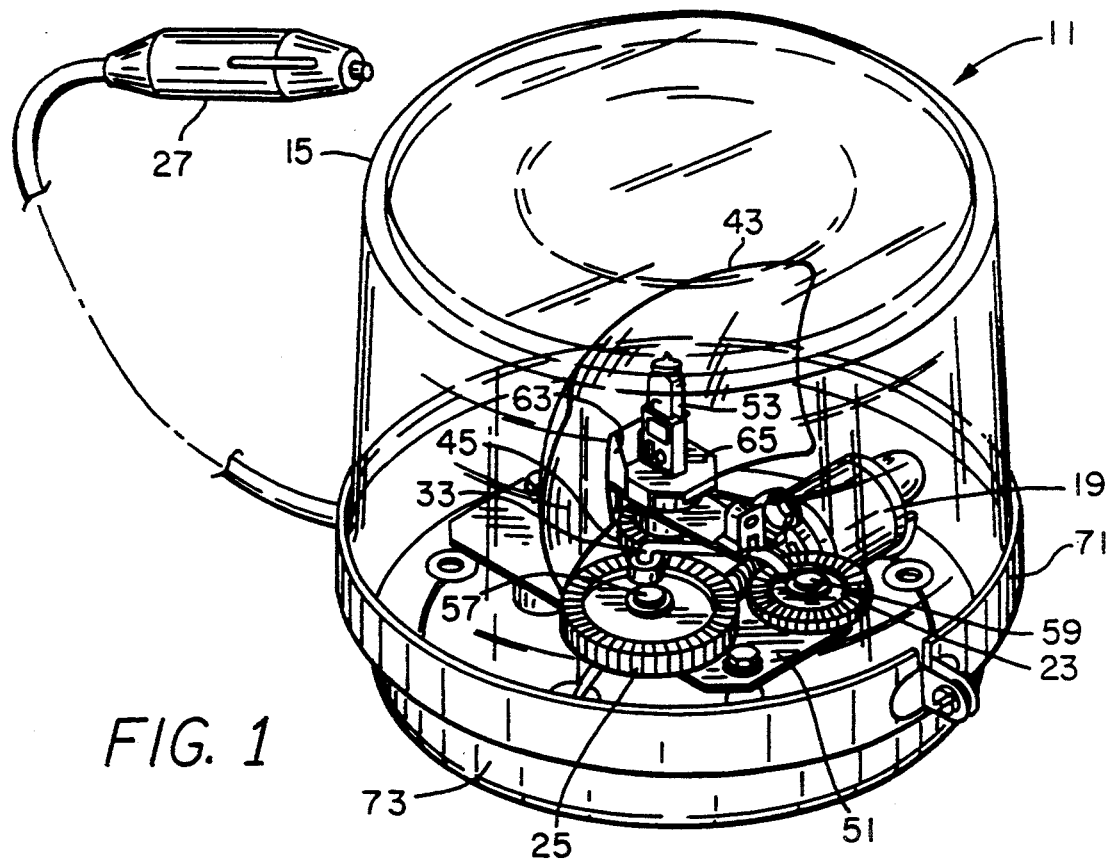
FIG. 1 is a perspective view of a warning light assembly in accordance with one embodiment of the invention.

Turning to the drawings, a warning light 11 comprises a base assembly 13 mated to a transparent dome 15. Under the dome 15 and supported on the base 13 is a mechanism 17 for generating and oscillating a light beam. The mechanism includes a D.C. motor 19 driving a speed-reduction transmission, which comprises a worm 21, a worm gear 23 and a spur gear 25. Typically, the D.C. motor 19 rotates at approximately 4,200 RPM when operating most efficiently, which is a free-running mode. To reduce the RPM of the transmission to less than 200 RPM (e.g., a range of 50 to 80 RPM) required for the proper flash rate and oscillating speed of the light beam, the size of the worm gear 23 and the pitch of the worm 21 is selected accordingly. In FIG. 1, an adaptor 27 to a cigarette plug taps the electrical system of an emergency vehicle (not shown) for providing a constant D.C. voltage to the motor 19. A drive shaft 18 of the motor 19 rotates continuously in one direction when the D.C. voltage is applied to terminals 29 and 31 of the motor. The worm 21 is fitted over and keyed to the drive shaft of the motor 19 and engages the worm gear 23, causing the worm gear to rotate continuously in one direction (e.g., counterclockwise as indicated by the arrow in FIG. 2) at a substantially reduced speed relative to the RPM of the worm and the drive shaft.

A crank 33 couples the worm gear 23 to the spur gear 25 and converts the rotary motion of the worm gear to an oscillating motion of the spur gear. The crank 33 has two journal ends 35 and 37 received by respective bearings 39 and 41 formed in the bodies of the spur gear 25 and the worm gear 23. The rotary motion of the worm gear 23 imparts a reciprocating movement to the crank 33 that translates to an oscillating movement of the spur gear 25.

Figure 2:
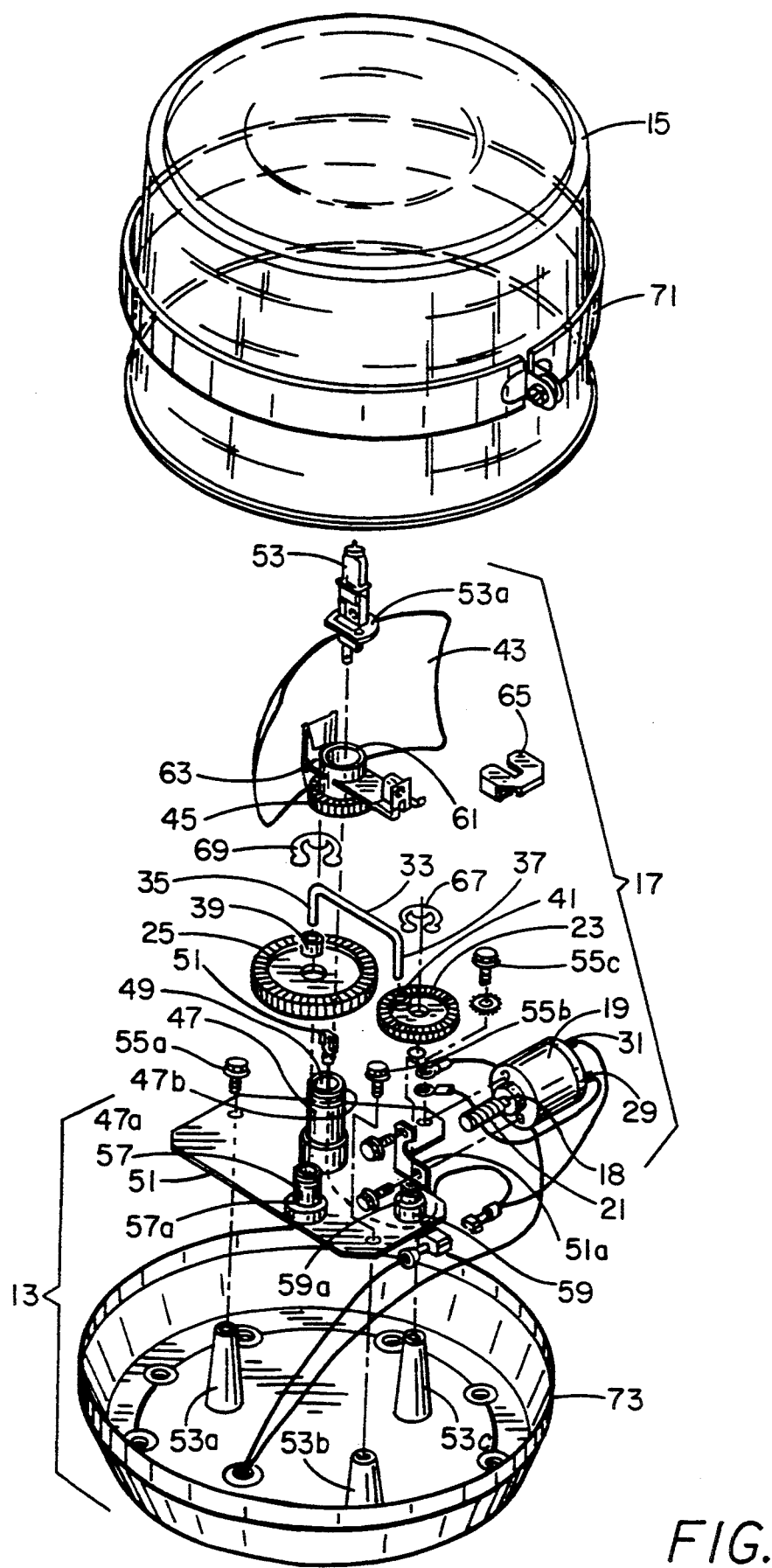
FIG. 2 is an exploded view of the warning light assembly of FIG. 1, clearly illustrating the construction of the assembly.

As generally indicated in FIG. 2, the crank 33 moves through a reciprocating stroke that defines an arc angle $\Theta$. By adjusting the relative diameters of the worm gear 23 and the spur gear 25, the stroke of the crank 33 can be varied, thereby changing the angle $\Theta$ through which the spur gear oscillates. The stroke of the crank 33 can be increased and thus the angle $\Theta$ can be increased by either increasing the diameter of the worm gear 23 or decreasing the diameter of the spur gear 25. There is a limit, however, to the stroke of the crank 33. As the stroke of the crank 33 approaches the diameter $D_1$ of the spur gear 25, the angle $\Theta$ approaches 180°. As will be appreciated by those skilled in the art of oscillating warning lights, for values of the angle $\Theta$ greater than approximately 110°, the force imparted by the crank 33 to the spur gear 25 becomes substantially radial in its direction, leaving an increasingly smaller torque for rotating the spur gear. Thus, in a conventional transmission for an oscillating warning light such as that illustrated in U.S. patent application Ser. No. 07/592,670 to Stanuch et al., the angle swept by an oscillating light is limited to approximately 110° in order to ensure that sufficient torque is exerted at the endpoints of the oscillation for reliable oscillation of the light beam.

In accordance with the invention, the warning light 11 oscillates through an angle $\beta$ that can be virtually any angle but must be greater than the angle $\Theta$ assuming that $D_1$ is greater than $D_2$. A parabolic reflector 43 is mounted to a second spur gear 45, which is driven by the first spur gear 25. The second spur gear 45 and the reflector 43 comprise a reflector and gear assembly mounted for rotation on a spindle 47 that includes a bore 49 for accommodating a socket 51 for a light source 53, which illuminates the surface of the reflector and creates the light beam. The second spur gear 45 is received by a bearing surface 47a of the spindle 47 for free rotation about a vertical axis. By selecting the appropriate ratio of the diameters $D_1$ of the first spur gear 25 and $D_2$ of the second spur gear 45, the angle $\beta$ can be virtually any angle, wherein said angles must be greater than the angle $\Theta$ assuming that $D_1$ is greater than $D_2$.

In order to maintain a low profile of the warning light 11, the transmission is mounted in the base assembly to rotate the first and second spur gears 25 and 45 in a common horizontal plane. In order to maintain compactness of the transmission and drive train, the first spur gear 25 is driven by the D.C. motor 19 by way of the worm and worm gear assembly, thus allowing the motor to be mounted in the base assembly 13 so as to minimize its vertical profile.

In order to support the transmission, a platform 51 is secured to a three-prong mount 53a–c by threaded screws 55a, 55b and 55c. The spindle 47 is made of metal, extends from the platform 51 and is fastened to it by conventional means (not shown). Spindles 57 and 59 are also made of metal, extend from the platform 51 and are fastened to it by conventional means. The spindles 57 and 59 have bearing surfaces 57a and 59a, respectively, for supporting the worm gear 23 and the first spur gear 25 for free rotation about vertical axes. The vertical axes of rotation of the worm gear 23 and the first and second spur gears 25 and 45 are mutually parallel.

The worm 21 driven by the motor 19 rotates about an axis perpendicular to the axes of rotation for the spur gears 25 and 45 and the worm gear 23. The worm 21 and worm gear 23 cooperate to rotate 90° the axis of the rotary drive force of the D.C. motor 19 from a vertical plane to a horizontal plane. Once in a horizontal plane, the rotary force is then transformed to a reciprocating movement by the crank 33, which in turn is transformed to a oscillating motion by the first spur gear 25. The second spur gear 45 magnifies the oscillation of the first spur gear 25 by an amount proportional to the relative sizes of the first and second spur gears.

In keeping with the invention, a coupling is provided to join the second spur gear 45 to a light beam assembly comprising a hub 61 received by the spindle 47 and a bracket 63 to which the reflector 43 is riveted. In the illustrated embodiment, the second spur gear is integral with the hub 61 and bracket 63 so as to be supported by the spindle 47 in a common horizontal plane of rotation with the first spur gear 25 and the worm gear 23. The hub 61 is open at its top to complement the bore 49 of the spindle 47, which receives the socket 51 for mating with the lamp 53 (e.g., a halogen lamp). For grounding and retaining the lamp 53, a clip 65 is received by a base portion 53a of the lamp and a grooved lip 47b of the spindle 47. Because of heat generated by the lamp 53, the material comprising the light beam assembly must be capable of withstanding high temperatures. An appropriate material for the assembly is a glass-filled nylon of conventional type (e.g., Nylon 66, 30% glass, by DuPont), which forms the assembly and the second spur gear as one piece using conventional injection molding processes. The first spur gear 25, the worm 21 and worm gear 23 are preferably made of a conventional acetal plastic such as Delrin ™ by DuPont.

In order to retain the gears 23 and 25 in place, clip fasteners 67 and 69 are received by annular grooves in the spindles 59 and 57 proximate the free ends of the spindles as illustrated. The platform 51 is made of conventional sheet metal, whereas the spindles 47, 57 and 59 are machined from metal stock. The clip 65 is also metal so as to ground the base 53a of the lamp 53 to the spindle 47, which in turn grounds to the platform 51. The negative terminal 29 of the motor 19 is secured to the platform 51 by mounting screw 55c as best shown in FIG. 2. In order to secure the motor 19, the platform 51 includes a bracket 51a having holes aligned with threaded screw holes in the casing of the motor for receiving screws as illustrated in FIG. 2, which mount the motor to the platform. Finally, an annular band fastener 71 secures the transparent dome 15 to a base 73 of the base assembly 13 when the annular lips or edges of the dome and the base are mated.

In the illustrated embodiment, the ratio of the angles $\Theta$ and $\beta$ is inversely proportional to the ratio of the diameters $D_1$ and $D_2$ of the spur gears 25 and 45 that generate the angles. When $\beta$ is greater than $\Theta$, $D_1$ is greater than $D_2$. In the illustrated embodiment, the relationship is as follows:

$$\frac{D_1}{D_2} = \frac{\beta}{\Theta}, \quad (1)$$

Figure 3:
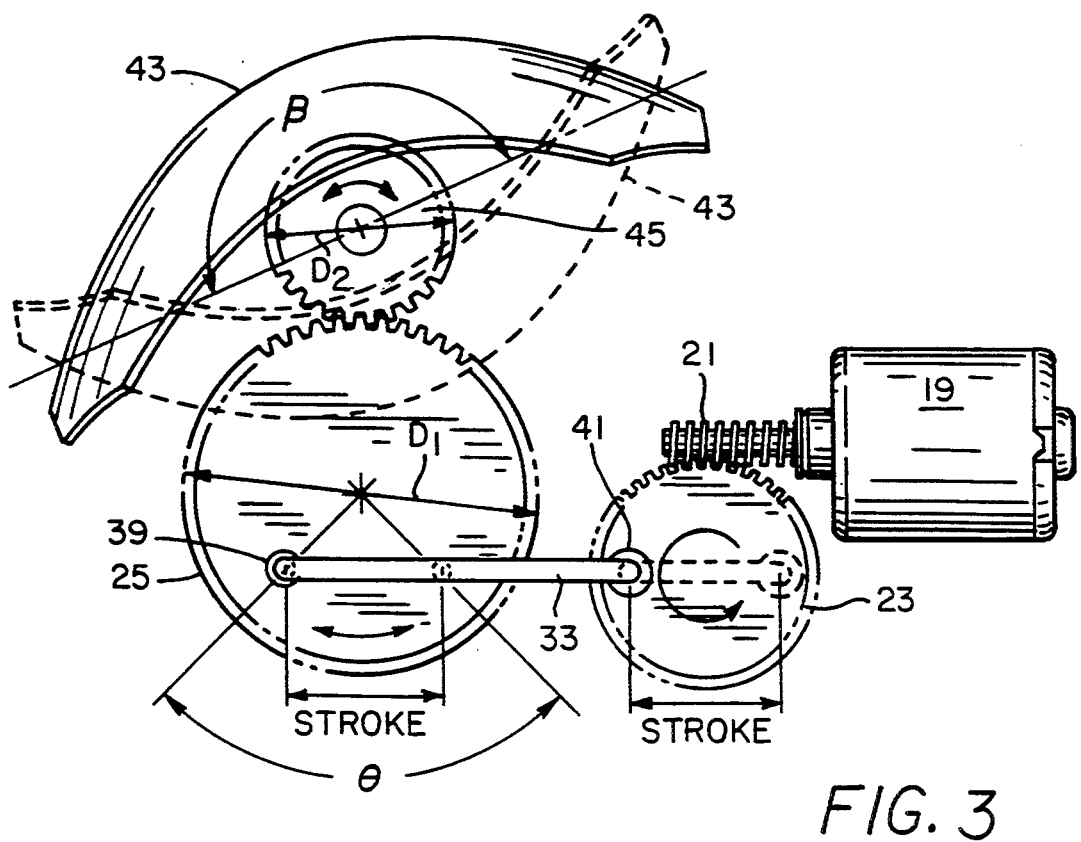
FIG. 3 is an isolated planar view of a three-gear drive train for the warning light assembly of FIGS. 1 and 2, which according to the invention oscillates a light beam through virtually any angle, depending on the relative sizes of the three gears comprising the drive train.

As can be readily appreciated from the foregoing relationship, the angle $\beta$ for the sweep of the beam can be fixed at any desired angle by selecting the appropriate relative sizes of the two spur gears 25 and 45. Furthermore, by adjusting the relative sizes of the worm gear 23 and the first spur gear 25, both the length of the stroke of the crank 33 (see FIG. 3) and the value of the angle $\Theta$ can be adjusted, which in turn results in adjustment to the value of the angle $\beta$. Also, the ratio of the angles $\beta$ and $\Theta$ is inversely proportional to the ratio of the total number of teeth on the spur gears 25 and 45. For the illustrated embodiment, the relationship is expressed as follows:

$$\frac{T_1}{T_2} = \frac{\beta}{\Theta}, \quad (2)$$

Where $T_1$ is the number of teeth on the first spur gear 25 and $T_2$ is the number of teeth on the second spur gear 45.

In a conventional prior art oscillating warning light using mechanical transmissions, the angular velocity of the reflector is substantially sinusoidal. That is, the velocity peaks at the mid region of the sweep of the reflector and then slows to a stop at an endpoint of the oscillation. Although the transmission of the present invention also is characterized by a slowdown immediately prior to the endpoints, the increased range of the sweep executed by the invention results in the sweep being substantially linear for large angles. In fact, by appropriately selecting the angle $\beta$, the velocity of the light beam generated by the reflector 43 can be made substantially linear over a full 180°. This feature allows the warning light assembly 11 to operate within narrow range of flash energies for the full 180°.

Figure 4:
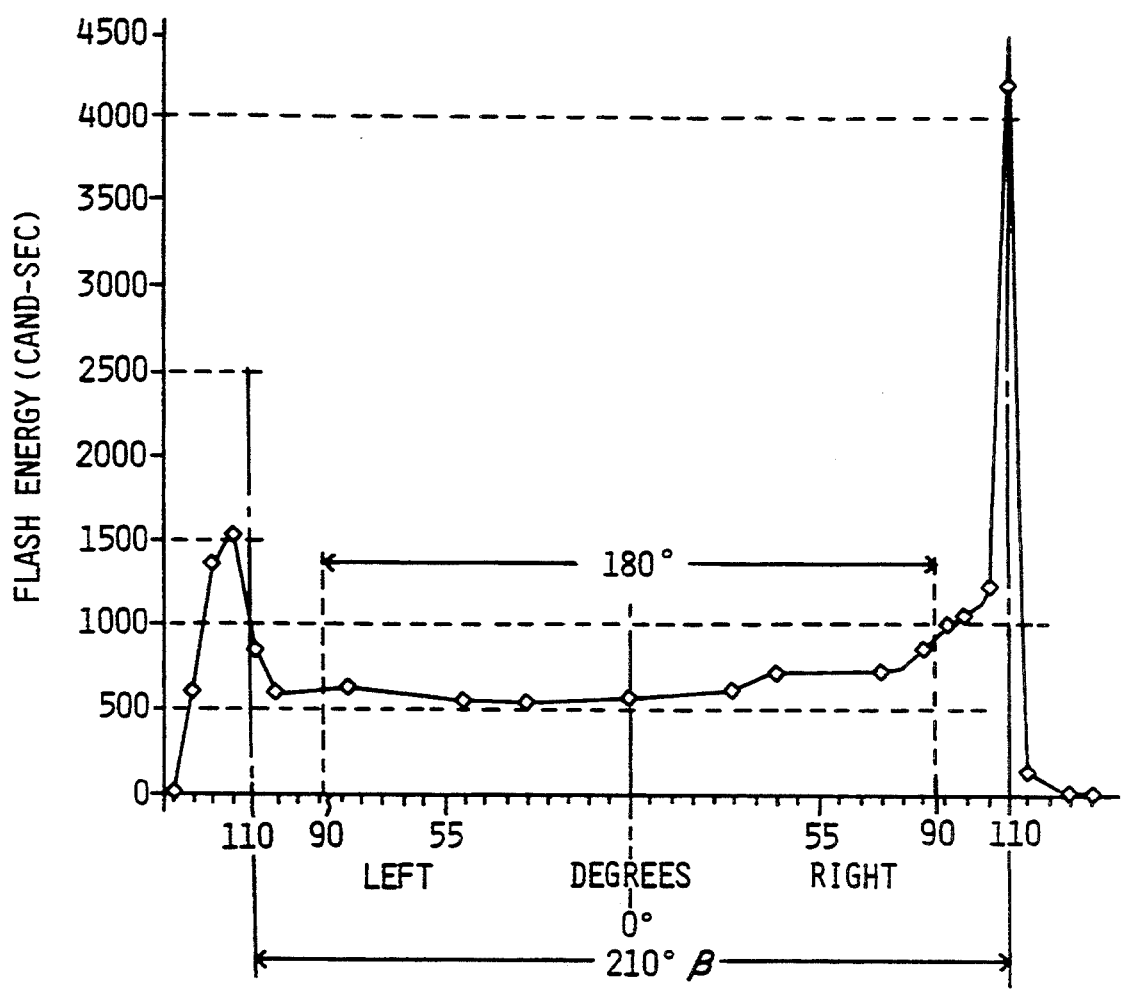
FIG. 4 is an exemplary graph illustrating the distribution of flash energy for an oscillating light beam generated by the warning light assembly of FIGS. 1-3, where the light beam oscillates over an angle of 180° at a substantially constant angular velocity.

Referring to the exemplary graph of FIG. 4, by selecting the appropriate ratio of the diameters $D_1$ and $D_2$ of the spur gears 25 and 45 and the length of the stroke of the crank 33, the warning light assembly 11 generates a substantially constant flash energy over a full 180°. For use in intersections, a minimum flash energy may be required over the full 180° in order to ensure the warning light can successfully compete against other stimuli for an observer's attention. A maximum limit to the flash energy may also be required. Accordingly, by selecting an angle $\beta$ of approximately 210°, a substantially constant flash energy of 6,000–7,000 candela-seconds is achieved for an entire 180° as indicated by the exemplary graph of FIG. 4. As the speed of the reflector 43 slows at the endpoints, the value of the candela-seconds peak at high values, but these values are outside the 180° sweep angle.

In the exemplary graph of FIG. 4, a 55 watt halogen lamp is assumed with the flash rate being 120 flashes per minute. The values of the flash energy in the graph are derived from experimental data collected by a conventional photometer located approximately 25 feet from a prototype of the warning light 11 with the dome 15 removed. The photometer was vertically positioned to read the highest candela level. The value of the flash energy was determined from the photometer at small angular increments across the sweep of the light beam.

In summary, a warning light assembly 11 is provided that oscillates through an angle $\beta$ that approaches and may exceed 180°. By selecting the appropriate sizes of the worm gear 23 and the first and second spur gears 25 and 45, the angle of the oscillating light beam can be tailored to any specification. Furthermore, this versatility is achieved by a simple transmission that is inexpensive and highly reliable. Moreover, the transmission is compact and maintains a low profile that allows the base assembly to also maintain a low profile.

I claim as my invention:

1. An oscillating warning light for an emergency vehicle, the warning light comprising: a base assembly having first, second, and third spindles whose axes are mutually parallel; a transparent dome for mating with the base assembly; a motor supported by the base for rotating a worm in one direction; a worm gear rotatably mounted to the first spindle of the base assembly and driven by the worm; a reflector and gear assembly rotatably mounted to the second spindle of the base assembly for reciprocating movement through an angle $\beta$; a light for illuminating the reflector for generating a light beam that oscillates through the angle $\beta$; a transmission interfacing the worm gear and the reflector and gear assembly for translating the rotary motion of the worm gear to the reciprocating movement of the reflector and gear assembly; and a reciprocating spur gear of the transmission rotatably mounted to the third spindle and in a driving relationship with a reciprocating spur gear of the reflector and gear assembly that is also rotatably mounted to said second spindle where the reciprocating movement of the spur gear of the transmission sweeps out an angle $\Theta$ that is less than the angle $\beta$.

2. An oscillating warning light as set forth in claim 1 wherein the transmission comprises the reciprocating spur gear of the transmission and a crank having first and second journal ends where the first journal end is received by a bearing formed on the surface of the reciprocating spur gear of the transmission at a radial location with respect to an axis of rotation of the spur gear of the transmission and the second journal end of the crank is received by a bearing formed in the worm gear at a radial location with respect to an axis of rotation of the worm gear.

3. An oscillating warning light as set forth in claim 2 wherein the second spindle to which the reflector and gear assembly is mounted includes means for mounting the light for illuminating the reflector.

4. An oscillating warning light as set forth in claim 1 wherein the reciprocating movements of the spur gears of the transmission and the reflector and gear assembly are related as follows:

$$\frac{D_1}{D_2} = \frac{\beta}{\Theta}$$

where $D_1$ is the radius of the reciprocating spur gear of the transmission and $D_2$ is the radius of the reciprocating spur gear of the reflector and gear assembly.

5. An oscillating warning light as set forth in claim 1 wherein the reciprocating spur gears of the transmission and the reflector and gear assembly include teeth evenly spaced about their periphery.

6. An oscillating warning light as set forth in claim 5 wherein the reciprocating movements of the spur gears of the transmission and the reflector and gear assembly are related as follows:

$$\frac{T_1}{T_2} = \frac{\beta}{\Theta},$$

where $T_1$ is the number of teeth on the spur gear of the transmission and $T_2$ is the number of teeth on the spur gear of the reflector and gear assembly.

7. A warning light for an emergency vehicle having a light beam that oscillates through an angle $\beta$, the warning light comprising: a base assembly and a mating transparent dome; a light beam assembly mounted to the base for rotation about a first axis; a first spur gear having a disc-like body for rotating about a second axis of rotation; a motor for rotating a drive shaft in one direction about a third axis of rotation that is approximately perpendicular to the first and second axes of rotation; a crank having first and second journal ends; a transmission coupled to the motor and to the first journal end of the crank for converting the rotary motion of the drive shaft to a reciprocating movement of the crank; a bearing formed in the body of the first spur gear for receiving the second journal end of the crank for converting the reciprocating movement of the crank to an oscillating motion of the first spur gear; a second spur gear driven by the first spur gear in an oscillating motion about the axis of rotation of the light beam assembly; and a coupling between the second spur gear and the light beam assembly for driving the assembly in the same oscillating motion as the second spur gear.

8. A warning light as set forth in claim 7 wherein the first and second spur gears have respective diameters $D_1$ and $D_2$, where the value of $D_1$ is greater than the value of $D_2$.

9. A warning light as set forth in claim 7 wherein the transmission comprises a worm and a worm gear.

10. An assembly as set forth in claim 9 wherein the first journal end of the crank is received by a bearing formed in a body of the worm gear.

11. A warning light as set forth in claim 7, wherein the light beam assembly oscillates through the angle $\beta$, which is greater than 180°.

12. A warning light as set forth in claim 7 wherein the coupling between the second spur gear and the light beam assembly is provided by a one-piece molding forming the second spur gear and the light beam assembly.

13. A warning light as set forth in claim 7 wherein the transmission includes a speed reduction means for translating the free-running speed of the motor to a frequency of the reciprocating motion of the crank that drives the oscillations of the first and second spur gears so as to provide a desired flash rate of the light beam.

14. A warning light as set forth in claim 13 wherein the RPM of the motor is more than two thousand RPM and the flash rate is on the order of less than 200 RPM.

15. A method of generating a flashing light using an oscillating warning light assembly, the method comprising the steps of:
   providing continuous power to a free-running motor whose drive shaft is in a first rotary motion of a predetermined RPM;
   converting the first rotary motion of the drive shaft to a second rotary motion of a reduced RPM which is less than the predetermined RPM of the drive shaft;
   converting the second rotary motion of the reduced RPM to a first oscillating motion that sweeps out an angle $\Theta$;
   coupling the first oscillating motion to a light reflector to drive the light reflector in a second oscillating motion that sweeps out an angle $\beta$ that is proportional to the angle $\Theta$ and is characterized by a substantially constant angular velocity over 180° or more of the angle $\beta$.

* * * * *

UNITED STATES PATENT AND TRADEMARK OFFICE
CERTIFICATE OF CORRECTION

PATENT NO. : 5,426,417
DATED : June 20, 1995
INVENTOR(S) : Edward S. Stanuch

It is certified that error appears in the above-indentified patent and that said Letters Patent is hereby corrected as shown below:

ON THE TITLE PAGE:

item [56] References Cited

U.S. PATENT DOCUMENTS please insert the following:

-- 2,893,251  7/1959   I.E. McWethy 3,125,888  3/1964   S. Fox et al.

4,519,021  5/1985   J.A. Oram 4,890,207  12/1989  D.C. Jones 5,095,414  3/1992   R.W. Tinus

OTHER DOCUMENTS

Confidential letter from the Ahrens-Fox Fire Engine Company to Federal Signal Corporation, dated November 30, 1992 --.

Signed and Sealed this

Third Day of October, 1995

*Attest:*

BRUCE LEHMAN

*Attesting Officer*          Commissioner of Patents and Trademarks